Patented Aug. 28, 1934

1,971,375

UNITED STATES PATENT OFFICE 1,971,375

SOAP

Lester F. Hoyt, East Aurora, N. Y., assignor to Larkin Co. Inc., Buffalo, N. Y.

No Drawing. Application January 9, 1932, Serial No. 585,807

4 Claims. (Cl. 87—16)

This invention relates to improvements in soap in paste or semi-fluid or jelly-like form.

Soap of this kind, as heretofore made, has had the objection that it contains a relatively large quantity of water. For example, shaving cream ordinarily contains about 50% of water and is not well adapted for use as toilet soap, since the high moisture content renders it susceptible to change in consistency with ordinary temperature changes, and moreover, such soaps readily dry out and harden when exposed to air. Toilet soap in cake form varies in moisture content from about 25% moisture in the white floating type of soap which is not milled, to from 5% to 12% of moisture in milled toilet soaps, the moisture content depending upon the age of the soap, conditions of storage of the same, and other conditions. Consequently, in the sale of soap heretofore available for toilet purposes in collapsible tubes or jars, the objection existed that such soap is merely ordinary soap, diluted with water, and that to produce the desired lather, it is necessary to use correspondingly more of such soap than of cake soap.

The objects of this invention are to produce a soft paste or jelly-like soap containing relatively small amounts of water so that the soap compares favorably with the water content of toilet soap in cake form; also to produce a soap of this kind in paste or jelly-like form suitable for dispensing in collapsible tubes or in jars or other containers, and which contains a relatively small amount of water, and at the same time is capable of being readily mixed with water to form a lather; also to provide a soap of this kind, the consistency of which does not readily change when exposed to different temperatures or atmospheric conditions; also to improve soaps of this kind in other respects hereinafter specified.

In accordance with my invention, I make a mixture of soap formed with an amine and a fatty acid, with a soap made partly or entirely of potash with a vegetable or animal fat or oil, preferably a vegetable oil. A number of organic amines have been found suitable for use in connection with the making of soap, it being, of course, necessary that the amines selected have sufficient basicity and also that they are not volatile so as to be driven off from the soap on heating. The most practical of these amines is commercial triethanolamine which contains some diethanolamine and mono-ethanolamine. Other amines which may be used for making soap with fatty acids are, for example, dimethylbenzylamine, mono-benzylamine, piperidine, diethylamine, triethylamine and higher hydroxyalkylamines, such as mono-, di-, tri-propanolamines or mixtures thereof. Soaps made with these amines and fatty acids of low melting point are liquid or jelly-like in form, but cannot of themselves be used conveniently as toilet soaps, for several reasons. If one attempts to use them as a toilet soap in the anhydrous state as liquids or soft pastes, it is found that when wetted with water they stiffen noticeably and are difficult to work into a lather. Although it is possible by adding sufficient water to make them into soft pastes which dissolve and lather freely, the amount of water required when dealing with pure triethanolamine soaps is often 50% or more and the resulting product is open to the objection that its consistency alters very easily with temperature changes and that such soaps become liquids on application of moderate heat. Furthermore, the cost of these pure tri-ethanolamine soaps is much higher than that of ordinary soaps.

The percentages in the ultimate product of the two soaps may vary considerably, depending to a large extent upon the nature of the fat or oil used. The amount of amine soap in the ultimate product may vary from 10% to 50%, and the amount of anhydrous potash soap from 15% to 60%, while the moisture in the mixture may vary approximately from 10% to 35%. The soap may also contain added quantities of alcohol or glycerin or both, and perfumes and coloring material may be used, if desired.

If it is attempted to make a soft toilet soap with some of the harder fats, or oils of high titer, or with caustic soda, instead of potash, so much hydroxyalkylamine soap must be used to make the soap soft that the resulting soap takes on some of the undesirable properties of the pure hydroxyalkylamine soaps. However, by the use of potash, instead of soda, and by selecting the softer fats or oils, I am able to make a soft soap having a sufficient amount of hydroxyalkylamine soap embodied therein so that the soap lathers freely, and is in every way satisfactory for use as a toilet soap, and furthermore, forms an excellent hard water soap.

With a soap of the kind described, the amount of water used must ordinarily be limited since if too much water is used within certain limits, for example, 50% with some mixtures of hydroxyalkylamine and potash soaps, the resulting soap, strange as it may appear, may become too stiff. If, on the other hand, too little water is used, the soap does not work up as well when used with water.

Any vegetable or animal fats or oils which are relatively soft and of low titer may be used in making this soap. Cocoanut oil, olive oil, corn oil, soya bean oil, sunflower seed oil, rapeseed oil, and practically all other vegetable oils are satisfactory for use in connection with this soap, cocoanut oil and olive oil being preferred. Mixtures of any of these oils may also be used. Examples of animal fats that may be used are neatsfoot oil, oleo oil and similar liquid or relatively soft animal fats.

A very satisfactory soap can, for example, be made by using about 30% of anhydrous tri-ethanolamine soap of cocoanut oil fatty acid, and 70% of potash cocoanut of olive oil soap base, or mixtures of such soap bases containing about 30% of water. The resulting finished tri-ethanolamine-potash soap mixture, consequently, will contain about 20% of water. It will be understood, of course, that when other oils or fats are used, it may be desirable to change the percentages given in this example.

Soap made in accordance with this invention compares very favorably with toilet soaps in cake form so far as water content is concerned, and the soap, furthermore, has excellent lathering properties, is easily handled in that it does not have the tendency to slide on wet hands, as is the case with shaving cream, and furthermore, can be used in washing in hard water, even sea water, because of the properties of hydroxyalkylamine soaps described in my United States Patent No. 1,833,899. This new paste toilet soap remains practically unchanged in consistency between 32° F. and 212° F., and works up easily and quickly when used with water and produces a copious lather having exceptional cleansing properties and leaves the skin soft and refreshed and produces no irritation.

The soap may be made, for example, by adding the fatty-acid-amine soap to a mixture of potash and an oil or fat, to cause the amine soap to accelerate the saponification, as disclosed in my United States Patent No. 1,833,900, or in any other suitable manner.

The soap described has the advantages that it can be readily packed in collapsible tubes, jars and other containers for convenience in travelling or transport.

I claim as my invention:

1. A soap in paste form, including from 10% to 50% of a soap formed of a hydroxyalkylamine and a fatty acid of a relatively soft fat or oil, from 15% to 60% of soap formed of potash and a relatively soft fat or oil, and having a moisture content of from 10% to 35%.

2. A detergent in paste form containing about 20 percent moisture and made from approximately thirty parts of anhydrous tri-ethanolamine soap of vegetable oil fatty acid, and about seventy parts of a vegetable oil soap made mainly with potash and containing approximately 30 per cent of water.

3. A soap in paste form including approximately 30 per cent anhydrous hydroxyalkylamine soap of a fatty acid of low titer, approximately 50 per cent of potash soap of an oil of low titer, and approximately 20 per cent water.

4. A soap in paste form comprising 10 per cent to 50 per cent of a cocoanut fatty acid soap of ethanolamine, 15 per cent to 60 per cent of potash vegetable oil soap, and 10 per cent to 30 per cent water and which retains its consistency substantially without change through a temperature range from the freezing to the boiling points of water.

LESTER F. HOYT.